(12) United States Patent
Walz

(10) Patent No.: US 7,837,755 B2
(45) Date of Patent: Nov. 23, 2010

(54) EXTRUDED SEAL

(75) Inventor: Stefan Walz, Ludwigsburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 503 days.

(21) Appl. No.: 11/586,600

(22) Filed: Oct. 26, 2006

(65) Prior Publication Data

US 2007/0089386 A1 Apr. 26, 2007

(30) Foreign Application Priority Data

Oct. 26, 2005 (DE) ................. 10 2005 051 503

(51) Int. Cl.
*B01D 46/00* (2006.01)

(52) U.S. Cl. ............... 55/502; 55/497; 55/521; 55/522; 55/528

(58) Field of Classification Search ............. 55/502, 55/497, 521, 522, 528
See application file for complete search history.

(56) References Cited

U.S. PATENT DOCUMENTS

| 2,397,759 | A | * | 4/1946 | Miroslav | 55/484 |
| 3,025,963 | A | * | 3/1962 | Bauer | 210/493.4 |
| 3,235,633 | A | * | 2/1966 | Holloway et al. | 264/46.9 |
| 3,457,339 | A | * | 7/1969 | Pall et al. | 264/162 |
| 5,556,440 | A | * | 9/1996 | Mullins et al. | 55/498 |
| 5,843,198 | A | * | 12/1998 | Walker | 55/486 |
| 5,904,846 | A | * | 5/1999 | Clements et al. | 210/321.77 |
| 6,406,509 | B1 | * | 6/2002 | Duffy | 55/492 |
| 6,533,845 | B2 | * | 3/2003 | Tokar et al. | 95/273 |
| 6,994,744 | B2 | * | 2/2006 | Tokar et al. | 95/273 |
| 7,300,486 | B1 | * | 11/2007 | Kirsch | 55/502 |
| 2004/0194441 | A1 | * | 10/2004 | Kirsch | 55/497 |

FOREIGN PATENT DOCUMENTS

| DE | 26 20 148 A1 | 12/1976 |
| DE | 692 00 618 T2 | 1/1993 |
| DE | 197 37 700 A1 | 3/1999 |
| DE | 199 33 205 A1 | 1/2001 |
| EP | 1 369162 A1 | 12/2003 |
| EP | 1 380 334 A1 | 1/2004 |
| EP | 1 464 372 A1 | 10/2004 |
| GB | 1 485 072 | 9/1977 |
| JP | 10-263348 A | 10/1998 |

OTHER PUBLICATIONS

Translation of EP 1380334 A1, published Jan. 2004.*
European Search Report dated Jan. 31, 2007 with English translation (seven (7) pages).

* cited by examiner

*Primary Examiner*—Robert J Hill, Jr.
*Assistant Examiner*—Christopher P Jones

(57) ABSTRACT

A filter element, including a filter medium, on which a seal is situated indirectly or directly, which is used for separating the filter intake side from the filter discharge side. The filter medium comprises a fibrous material. The seal is applied indirectly or directly to the filter medium in the extrusion method (FIG. 1).

9 Claims, 2 Drawing Sheets

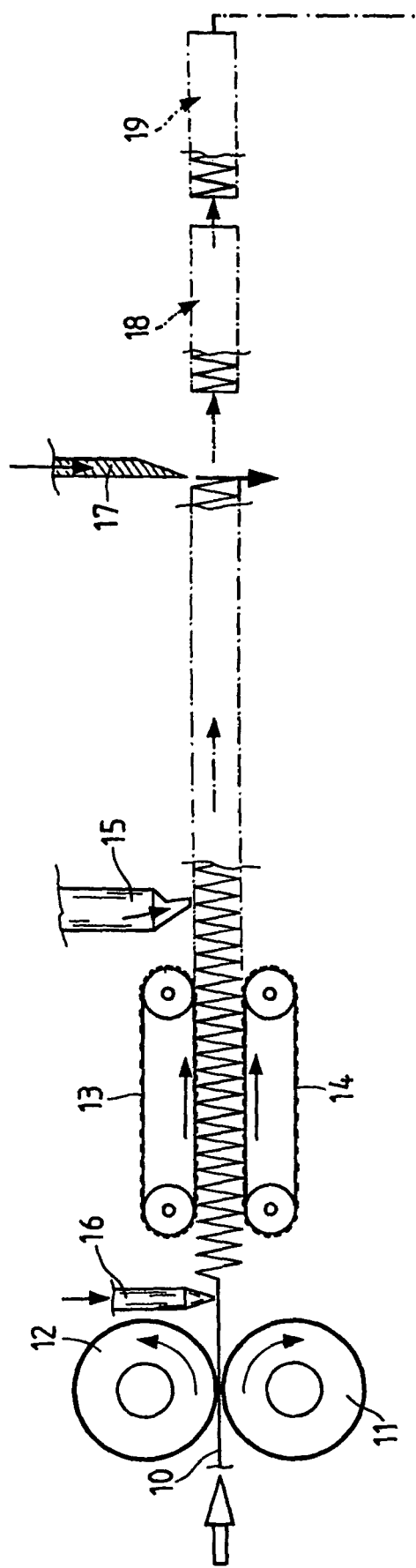
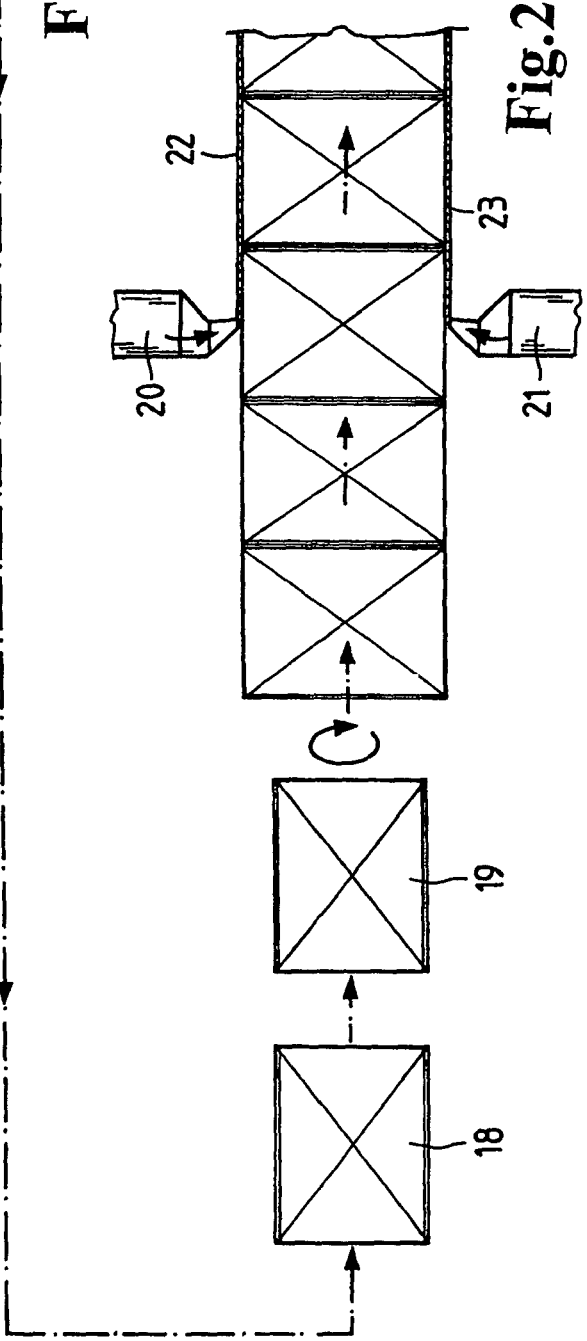

EXTRUDED SEAL

The present invention relates to a filter element comprising a filter medium with a seal situated thereon and a method for producing such filter elements.

BACKGROUND OF THE INVENTION

In the automobile industry in particular, filter elements are used for the intake air of the internal combustion engine and/or for filtering the air supplied to the interior. Such filter elements have PUR polyester or PUR polyether foam seals for the seal between the unfiltered air side and the filtered air side. One disadvantage of such foam seals is that these seals may absorb moisture and deposits may form on the seals. Furthermore, such glued-on seals may be sheared off during installation into the complex filter housing provided for this purpose and thus no longer fulfill the required sealing tasks.

A filter element is known from DE-OS 26 20 148, for example, which is constructed from corrugated paper filter webs and is enclosed on its lateral front faces using lateral strips, which are glued onto the filter webs using an adhesive. These lateral strips are produced from a premolded, foamed plastic and are used to seal the filter element in relation to the holder of the filter element.

In order to simplify the production method, it is additionally known from DE 197 37 700 A1 that the lateral strips, like the filter webs, are produced from a paper web and are additionally provided with an adhesive layer. If at least one tear-proof thread or a corresponding band is situated on the adhesive layer, a sufficient strength of the lateral strip may be achieved.

The present invention is based on the object of refining a filter element of the type cited at the beginning in such a way that it is producible using simple means, has a low susceptibility to moisture and deposits, and fulfills the required sealing tasks and the required high strength.

This object is achieved by the filter element and production method as described and claimed hereinafter.

SUMMARY OF THE INVENTION

An advantage of the present invention is that the seal element according to the present invention comprises a polymer material, which produces a very close bond to the fibrous filter medium. Due to the high temperatures of approximately 200° C. which exist at the die during an extrusion method, the seal material penetrates into the fiber scrim of the filter medium and/or partially encloses these fibers, so that the seal material bonds to the fibers in a formfitting way. This produces not only a high strength, but rather also a high sealing effect simultaneously. A further advantage of the present invention is also that the use of the extrusion method results in a shortening of the production time, and thus simultaneously an improvement of the cost-effectiveness of the filter element manufacturing. Where until now, for example, a polyurethane resin (PUR) foam was introduced into a casting mold and had to cure and/or foam up for a certain time, the extrusion method results in the filter element being able to be processed further directly after the extrusion procedure. The seal has outstanding rubber-elastic properties, and simultaneously also has a stabilizing effect on the filter medium.

According to one embodiment of the present invention, in the event of an indirect connection between filter medium and seal, the possibility exists of providing a medium, such as a nonwoven strip, which is bonded to the filter medium by gluing, welding, or embossing. This medium may fulfill various additional tasks, thus, it is possible with a filter folded in a zigzag shape to cover the front faces of the folds using the medium, the possibility also exists of equipping the medium itself with sealing functions through appropriate implementation, such as crease folding.

In an advantageous embodiment, an adhesive force of the seal which withstands a tensile load >1 $N/mm^2$ results due to the extrusion method. This seal may comprise a foamed or foaming material.

For example, it may be a thermoplastic vulcanizate, elastomer, duroplastic, or polyurethane, and/or silicone.

According to a refinement, the intermediate layer on which the seal is situated is a thermoplastic. To improve the frictional connection, the surface of this plastic may be pretreated, roughened, or textured.

In a further advantageous embodiment, the seal is implemented from various materials or material components, and/or from multiple layers. Thus, for example, the possibility exists of working with multiple extrusion heads to apply different materials and multiple layers simultaneously. The possibility also exists of extruding multiple layers of seal material on the filter element in sequence or simultaneously in the coextrusion method using a single extrusion head.

A method for producing a filter element describes an extrusion method in which a relative movement occurs between the extrusion head and the filter element onto which the seal is applied. The angle of attack of the extrusion head to the filter element is selected so that the seal material flowing out not only lies on the filter medium, but rather is extruded into the filter medium.

In one embodiment of the method, the seal may be applied to the filter medium in the robotic extrusion method, as is described, for example, in DE 69200618. The extrusion head is situated on a robot which is guided automatically along a specific path over the surface of the object, the seal material being heated on the way to the extrusion head.

The possibility also exists of applying the seal in the injection molding or casting methods, of course. Precisely the use of the extrusion method allows very high speeds to be achieved in applying the seal, since the extrusion head is guided along a filter medium and/or the prefinished filter element at a very high speed. This may be used for the purpose of first producing multiple filter elements in the endless method, i.e., the filter elements are bonded to one another and form an endless strand. The seal is first applied to both sides of these filter elements in the extrusion method, also endlessly. Subsequently, the filter elements are isolated and pivoted by 90° so that in a second method step the two remaining sides may be equipped with seals.

In a further embodiment of the present invention, further components are situated on the filter element during application of the seal, in this way, components may be integrated into the seal, such as fastening structures or handling devices.

The extruded seal element may be designed as lip-like, for example, the possibility also exists of extruding a seal which has a cavity, for example, displays a profile similar to an O-shape or an Ω-shape. The possibility also exists of fixing the seal element on lateral parts which describe a radius or extruding the seal element continuously over corners of the filter element through the extrusion method.

The surface of the seal element may be equipped with the ability to slide, a corresponding material selection is to be made for this purpose. If the seal element is implemented as lip-shaped, the sealing lip has a uniform wall thickness or runs to a taper or point. An extruded seal may be printed or embossed to identify the product without further measures.

BRIEF DESCRIPTION OF THE DRAWINGS

An illustrative embodiment of the present invention is described in the following on the basis of the drawing.

FIG. 1 shows a schematic illustration of the production process of the filter element having an extruded seal;

FIG. 2 shows a top view of further method steps for applying the seal in the extrusion method.

DETAILED DESCRIPTION OF PREFERRED EMBODIMENTS

Figure 3:
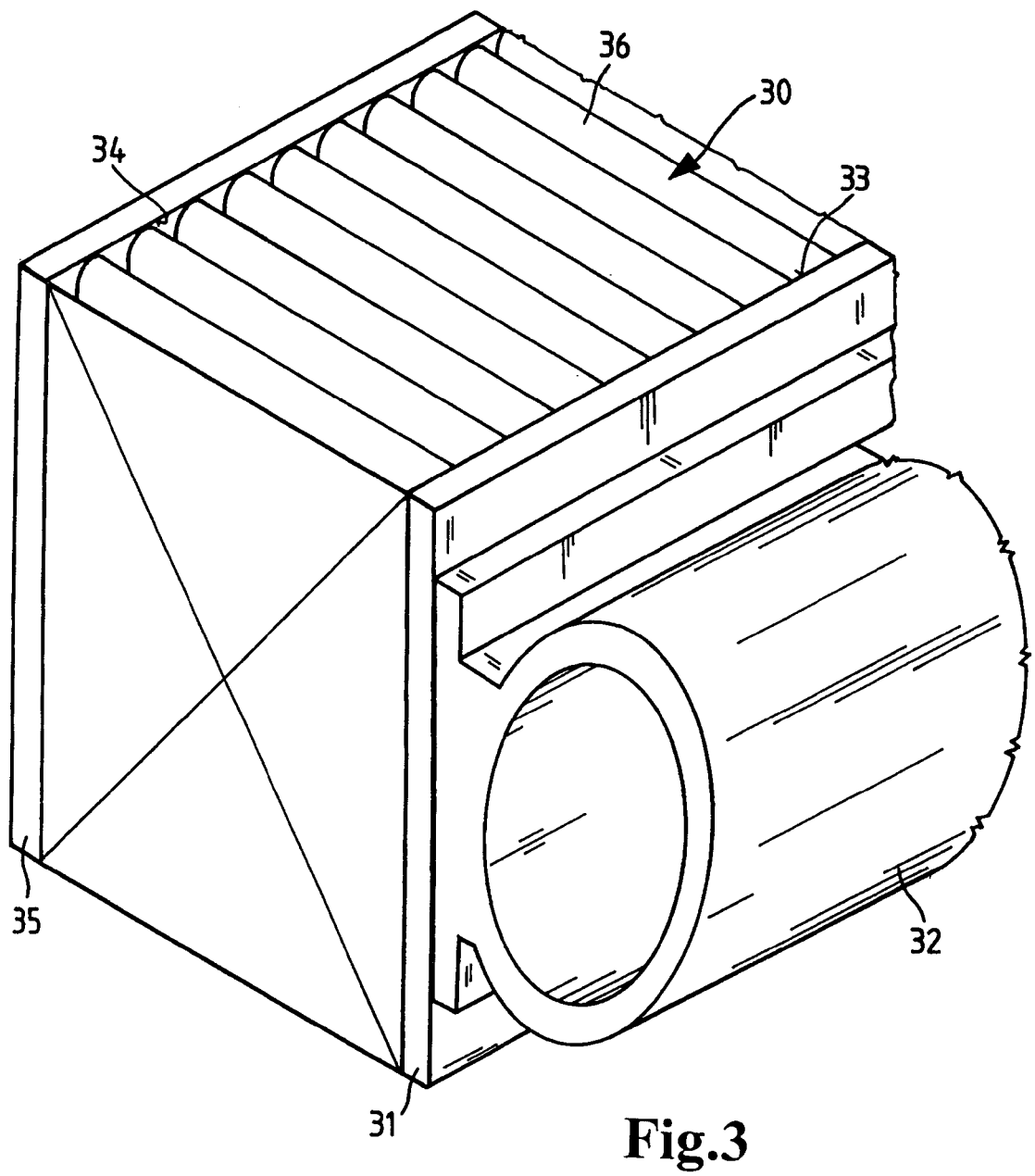
FIG. 3 shows an extruded seal in a sectional illustration.

FIG. 1 shows a filter medium 10 which is supplied in the form of a web to two embossing rollers 11, 12. Crease edges are embossed into the filter medium in this area, the filter medium is subsequently erected to form a filter element folded in a zigzag shape, which is guided between two toothed belts 13, 14 and approaches extrusion heads 15 situated on both sides of the filter web. A glue bead is applied to both front faces of the filter medium after the embossing using a glue application head 16, which results in laterally sealed gluing of the folds upon the subsequent folding. Seal strands, which cool directly after the application and unfold their elastic properties, are applied to both sides of the filter web in the upper edge area of the filter web using the extrusion heads 15.

The next method step is an isolation of the filter elements, for this purpose a cutting device 17 is provided, which cuts the filter elements 18, 19 to the required length during the cutting procedure. These filter elements 18, 19 are guided further rotated by 90° as shown in FIG. 2. In a further method section, they thus pass through a further manufacturing step, namely the application of the extruded seal to the remaining further front faces. The two seals 22, 23 are applied via extrusion heads 20, 21. After the application and curing, the seal strands are cut off at the transitions between the individual filter elements and the filter element is completely provided with a filter frame.

FIG. 3 shows a detail illustration of a filter element 30 in a three-dimensional sectional illustration. This filter element is folded in a zigzag shape. The upper fold edges 36 may be seen at the upper edge of the filter element. Lateral bands 31, 35 are glued onto the two front faces 33, 34. An extruded seal 32 may be recognized on the right front face 33. This seal has the shape of an Ω and is implemented as hollow inside, it thus has a high elasticity and may also bridge high manufacturing tolerances. No seal is shown on the left side of the filter element. Of course, the possibility also exists of situating such a seal here.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element, comprising a filter medium, on which an extruded seal formed separately from the filter element is indirectly or directly secured, which is used for separating the filter intake side from the filter outflow side, wherein the filter medium comprises a fibrous material with a side surface for adhering to the extruded seal, and wherein the extruded seal is directly secured to the side surface of the filter medium and does not extend to upper or lower fold edges of the filter medium, a material forming the extruded seal being selected to penetrate a fiber scrim of the side surface of the filter medium to secure the seal.

2. The filter element according to claim 1, wherein in the event of an indirect bond between filter medium and seal, a medium is provided as an intermediate layer forming the side surface, which comprises a fibrous material, and this medium being bonded to the filter medium through gluing, welding, or embossing.

3. The filter element according to claim 1, wherein the bond between one of the filter medium and an intermediate layer and the seal has an adhesive force which withstands a tensile load greater than 1 N/mm$^2$.

4. The filter element according to claim 1, wherein the seal comprises a foamed material.

5. The filter element according to claim 1, wherein the seal is a thermoplastic vulcanizate or an elastomer or a thermoplastic elastomer or a duroplastic or a polyurethane or a silicone.

6. The filter element according to claim 1, wherein the seal is partially situated on intermediate layers, which comprise polymers having a roughed or textured surface for the frictional connection of the intermediate layers to the seal.

7. The filter element according to claim 6, wherein the polymers comprise at least one of polypropylene, polyamide and polystyrene.

8. The filter element according to claim 1, wherein the seal comprises various materials or material components and/or has multiple layers.

9. The filter element according to claim 1, wherein the extruded seal includes a circumferentially closed wall profile defining a cavity at an interior of the seal.

\* \* \* \* \*